Feb. 27, 1940. F. B. HEWEL 2,191,528
SPRING HOLDER FOR VEHICLES
Filed June 30, 1937
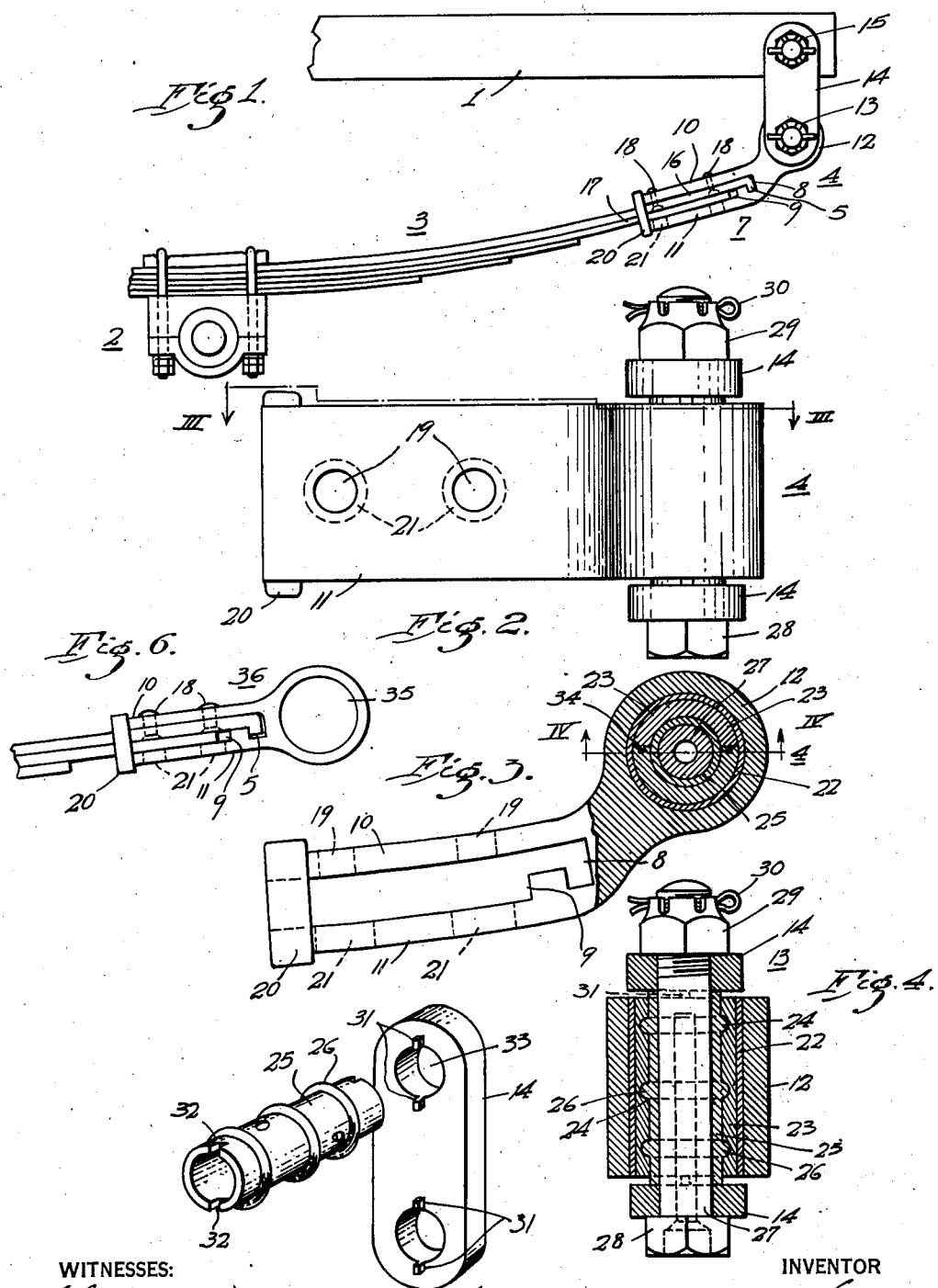
WITNESSES:
INVENTOR
Frank B. Hewel.
BY
William R. Coley
ATTORNEY Patented Feb. 27, 1940

2,191,528

UNITED STATES PATENT OFFICE 2,191,528

SPRING HOLDER FOR VEHICLES

Frank B. Hewel, Pittsburgh, Pa.

Application June 30, 1937, Serial No. 151,082

6 Claims. (Cl. 267—54)

My invention relates to spring holders or mountings for vehicles, and it has for one object to provide a relatively simple but effective holder or mounting from the standpoint of the leaf springs and also of the vehicle frame.

One object of my invention is to provide a vehicle spring structure comprising the usual series of spring leaves of different lengths, together with a holder or receiving-member slotted to fit the ends of a plurality of the leaves, the holder being pivotally attached to the vehicle frame.

A more specific object of my invention is to provide an elongated member slotted to fit the ends of a plurality of the spring leaves and having an aperture located beyond the leaf ends and extending transversely thereof, together with a pivotal connection extending through said aperture for connecting the holder to the vehicle frame.

Another object of my invention is to provide a composite bearing structure for vehicle spring mountings comprising parts interlocked against relative axial movement and a plurality of arms having a pivotal mounting within the bearing structure and interlocked therewith against rotary movement.

A further object of my invention is to provide a vehicle spring mounting embodying all of the features mentioned above, whereby a simple and readily applied but rugged and effective spring holding or mounting structure is provided.

Other objects of my invention will be come evident from the following detailed description, taken in conjunction with the accompanying drawing, wherein:

Figure 1 is a fragmentary view in side elevation of a spring structure and vehicle frame organized in accordance with my present invention;

Fig. 2 is an enlarged bottom plan view of the spring mounting means shown in Fig. 1;

Fig. 3 is a view in side elevation of this spring mounting means, certain of the parts being shown in section;

Fig. 4 is a longitudinal section through the spring mounting means, taken along the line IV—IV of Fig. 3;

Fig. 5 is an exploded view of certain of the parts of the spring holder shown in Fig. 4; and Fig. 6 is a view in side elevation of a modified form of my spring holder or mounting.

Referring to Figs. 1 to 5 of the drawing, the structure there shown comprises a vehicle frame 1, together with an axle structure 2 and a leaf spring structure 3 interconnecting the two by means of my spring mounting means 4 attached to the end of the leaf spring.

The vehicle frame, the axle and its mounting on the central portion of the leaf spring 3 may be of any familiar type and need not be described in detail here.

The leaf spring 3 is also of a familiar type in which, as the leaves progress from the outer to the inner layer, they become gradually longer. However, the longest spring leaf 16 preferably has a lateral projection or downwardly-turned end portion or ridge 5.

My spring mounting means 4 is provided with an elongated body portion 7 having contiguous slots 8 and 9 of different lengths to fit the ends of the corresponding different-length spring leaves 16 and 17, the outer end of upper slot 8 extending downwardly to properly accommodate and anchor end portion 5 of upper leaf 16. The outer portions or arms 10 and 11 of the elongated body 7 contact with and extend parallel to the leaf portions, and outer or upper arm 10 may be secured to upper leaf 16 by means of rivets or bolts 18, for example, passing through holes 19 in the arms 10 and 11 and corresponding holes near the end of leaf spring 16. In addition, the leaf spring ends are held in position by inner end straps or side plates 20 on the arms 10 and 11, thereby also preventing the spreading of these arms. In order to readily permit riveting the parts 10 and 16 together, large openings 21 are provided in lower arm 11 opposite the rivets 18. After this riveting operation, the downwardly turned end 5 of leaf 16 being disposed in its interlocking position in slot 8, the remainder of the leaf spring assembly may be completed, with leaf 17 being adapted to slide in slot 9 between leaf 16 and lower arm 11.

It will be understood that, if desired, more than the two leaves I have shown may be fitted into a correspondingly slotted holder, following the teachings of my present invention.

The end of the elongated body portion 7 remote from the leaf spring 3 is substantially cylindrical in form, as indicated at 12, and a composite bearing structure 13 extends through an aperture or eye in the cylindrical portion 12 and at its ends is attached to a plurality of shackle arms 14 which are also secured through a similar bearing structure 15 to an adjacent end of the vehicle frame 1.

The composite bearing structure 13 (bearing structure 15 being substantially identical) is shown as comprising a hollow steel cylinder or shell 22 press-fitted within the eye in the cylindrical portion 12 and tightly enclosing either a solid, welded or preferably a split bearing holder or bushing 23 having a plurality of peripheral grooves 24 in its interior surface and in turn surrounding a bronze or other suitable bearing cylinder 25 provided with a plurality of peripheral ribs or ridges 26 which fit within the above-mentioned grooves 24. Preferably, the halves of bushing 23 are provided with longitudinally extending tongue- and-groove joints, as shown at 34 in Fig. 3. If desired, the outer shell 22 may be omitted, bushing 23 being adapted to fit tightly within the eye in cylindrical portion 12 and around bearing cylinder 25.

A suitable shaft, such as a shackle bolt 27, having a head 28 at one end, extends through the bearing 25 and is provided at its other end with a suitable castellated nut 29 which is held in place by means of a cotter pin 30 extending through a hole in the outer threaded end of the bolt 27 and being locked in the grooves of the nut 29.

In addition, a plurality of small lugs or tongues 31 are provided on the inner sides of the arms 14 adjacent to the openings 33, through which the bolt 27 passes, these lugs fitting within slots or grooves 32 in the ends of the bearing member 25, thus forming a tongue-and-groove connection at each end of the composite bearing structure.

It will be noted that in my composite bearing structure longitudinal movement of the bearing proper 25 with respect to the bearing holder 23 is precluded by reason of the provision of the interlocking ridges 26 and grooves 24 which, of course, might be interchanged within the scope of my invention. The fit between the split bushing 23 and the steel cylinder 22, if employed, is a press fit, as is also the fit between the cylinder 22 and the cylindrical portion 12 of my vehicle mounting means. In addition, relative rotary movement of the arms 14 with respect to the bearing proper 25 is prevented by means of the above-described tongue-and-groove connection (31, 32).

In this way, the parts of my composite bearing structure are so interlocked that the entire vehicle mounting structure may rotate around the bolt 27 as a pivot, no longitudinal movement, either relative or otherwise, of the parts being permitted, while at the same time, no relative rotary movement between the arms 14 and the bearing proper 25 and, therefore, between the arms 14 and the outer portions of the composite bearing structure is permitted.

Fig. 6 shows a modified form of mounting in which the aperture 35 at the outer end of my spring holder 36 may be relatively larger in diameter than in the structure shown in the other figures and, in addition, is located in substantial alinement with the ends of the spring leaves, instead of being disposed at a level above them as in the other figures. This modification will tend to relieve strain on the top leaf or leaves and make it possible to arch the leaves more, providing easier riding. The enlarged eye or aperture 35 will permit the use of rubber type bushings, if desired.

It will thus be seen that I have provided a vehicle spring mounting which is relatively simple in character and readily applied, having a minimum number of parts by reason of being connected directly to the spring ends, and at the same time the bearing structures for permitting pivotal movement between the spring and the vehicle frame respectively have their parts so interlocked as to prevent undesired longitudinal or rotary movement thereof.

I do not wish to be restricted to the specific structural details or arrangement of parts herein set forth, as various further modifications thereof may be effected without departing from the spirit and scope of my invention. I desire, therefore, that only such limitations shall be imposed thereon as are indicated by the appended claims.

I claim as my invention:

1. A vehicle spring structure comprising a plurality of spring leaves of different lengths, an elongated member having top and bottom arms extending lengthwise of said leaves, said arms having an irregular slot between them to fit the ends of a plurality of said leaves and having an aperture extending transversely thereof, and means mounted in said aperture for pivotally attaching said member to the vehicle frame.

2. A vehicle spring structure comprising a plurality of spring leaves of different lengths, one of said leaves having a lateral projection at its end, an elongated member having top and bottom arms extending lengthwise of said leaves, said arms having an irregular slot between them to fit the ends of a plurality of said leaves including said projection and having an aperture extending transversely thereof, and means mounted in said aperture for pivotally attaching said member to the vehicle frame.

3. A vehicle spring structure comprising a plurality of spring leaves of different lengths, a receiving member having top and bottom arms extending lengthwise of said leaves, said arms having an irregular slot between them to fit the ends of a plurality of said leaves, a securing member extending through one arm of said receiving member and only one of said leaf ends, a contiguous leaf end being freely slidable within said slot on said one leaf end, and means for attaching said member to the vehicle frame.

4. A vehicle spring structure comprising a plurality of spring leaves of different lengths, an elongated member having top and bottom arms extending lengthwise of said leaves, said arms having an irregular slot between them to fit the ends of a plurality of said leaves and having an aperture extending transversely thereof, a securing member extending through the top arm of said elongated member and only the uppermost of said leaf ends, a contiguous leaf end being freely slidable within said slot on said uppermost leaf end, and means mounted in said aperture for pivotally attaching said member to the vehicle frame.

5. A vehicle spring structure comprising a plurality of spring leaves of different lengths, an elongated member having top and bottom arms extending lengthwise of said leaves, said arms having an irregular slot between them to fit the ends of a plurality of said leaves and having an aperture extending transversely thereof, a composite bearing structure mounted in said aperture, one part of said bearing structure having a peripheral rounded ridge and a contiguous part a corresponding groove to prevent relative axial movement but permit relative rotational movement of said parts, a shaft fitting within and movable with one of said parts, and a plurality of arms mounted upon said shaft and interlocked with that part with which said shaft is movable.

6. A vehicle spring structure comprising a plurality of spring leaves of different lengths, an elongated member having top and bottom arms extending lengthwise of said leaves, said arms having an irregular slot between them to fit the ends of a plurality of said leaves and having an aperture extending transversely thereof, a composite bearing structure mounted in said aperture, one part of said bearing structure having a peripheral protuberance and a contiguous part a corresponding recess, one of said parts forming a bearing for the other, a shaft fitting within and movable with said other part, and a plurality of arms secured to said shaft and having a tongue-and-groove connection with said other part.

FRANK B. HEWEL.